Patented Feb. 22, 1949

2,462,358

UNITED STATES PATENT OFFICE 2,462,358

AMIDES OF ACETOACETIC ACID AND PROCESS FOR THEIR PREPARATION

John R. Caldwell, Kingsport, Tenn., assignor to Eastman Kodak Company, Rochester, N. Y., a corporation of New Jersey No Drawing. Application June 21, 1946,
Serial No. 678,353

7 Claims. (Cl. 260—404.5)

This invention relates to the preparation of amides of acetoacetic acid and more particularly with the preparation of amides containing the acetoacetate radical in combination with a long chain aliphatic hydrocarbon radical containing from 8 to 24 carbon atoms.

An object of the invention is to provide a process for making a new class of acetoacetyl amide compounds containing ketone groups in combination with amide groups and long chain hydrocarbon radicals. A further object of the invention is to provide a new class of plasticizers and softeners for cellulose inorganic and organic ester plastics and for the vinyl resins. The invention further provides new and improved conditioning agents for the treatment of yarns and fabrics. Many of the compounds of the invention are oil soluble and may be added to lubricating oils and greases in order to improve the film strength and adhesion to metals. The new compounds are also valuable as surface active agents and may be employed as emulsifiers and detergents. Other objects will appear hereinafter.

In accordance with the invention these and other objects are attained by condensing acetoacetic acid or a compound in which the acetoacetyl radical is readily available with a substituted aliphatic amine or polyamine to produce compounds having the general structure

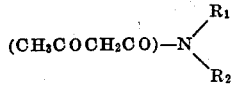

wherein $R_1$ and $R_2$ each may be a hydrocarbon radical containing 8 to 24 carbon atoms which may be interrupted by one or more nitrogen atoms in the chain, and which radical may also contain amide linkages. Either, but not both, $R_1$ or $R_2$ may also be a hydrogen atom when the other has the above stated values.

$R_1$ and $R_2$, for example, may include the hydrogen radicals $C_8H_{17}$—, $C_{10}H_{21}$—, $$C_8H_{17}CH:CH(CH_2)_8—$$

$C_{18}H_{37}$—, etc.; or may include such radicals, in which an amide group interrupts the carbon chain, as —$C_2H_4$—NH—$COC_6H_{13}$,

—$C_2H_4$—NH—$COC_{17}H_{35}$ and

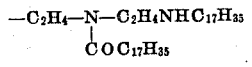

Acetoacetic acid may be employed in the reaction but for reasons of economy and convenience, it is preferred to employ diketene as the source of the acetoacetyl radical $CH_3COCH_2CO$—.

Diketene is derived from the polymerization of two molecules of ketene and has the structure

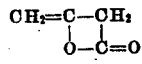

Diketene reacts with amines according to the equation:

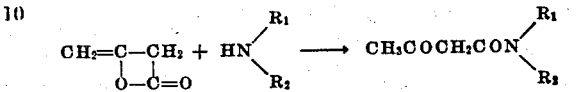

wherein $R_1$ and $R_2$ have the significance described above.

The compounds of the invention are readily prepared by reactions of the following types:

(a) Diketene is treated with a long chain alkylamine as represented by the equation:

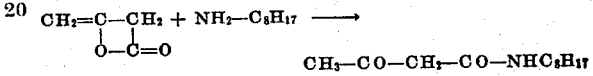
$$CH_3—CO—CH_2—CO—NHC_8H_{17}$$

(b) A fatty acid is condensed with a polyamine to produce a mixed amino-amide compound:

$$NH_2—C_2H_4—NH_2 + C_{17}H_{35}COOH \rightarrow$$
$$C_{17}H_{35}—CO—NH—C_2H_4—NH_2$$

This product is then treated with diketene to form the acetoacetic derivative

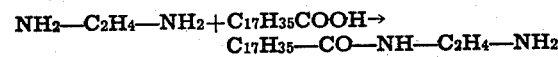
$$C_{17}H_{35}—CO—NH—C_2H_4—NH—COCH_2COCH_3$$

Fatty acids that may be employed in the process of the invention include oleic, lauric, stearic, palmitic, ricinoleic, pelargonic, capric and arachidic acid. Also the napthenic acids derived from petroleum and containing 8 or more carbon atoms are advantageously adapted to the invention.

The diketene is reacted with the long chain alkylamine preferably in the presence of an inert diluent such as ethylene dichloride, dioxane and toluene and so forth, to aid in controlling the rate of reaction since the reaction is a vigorous exothermic reaction. The solution is stirred and the temperature is maintained by suitable cooling apparatus below 60° C. and preferably in most instances in the range of 45-50° C. or below. At the conclusion of the reaction the diluent is distilled from the product.

If it is desired to form the alkylamine, the fatty acid and the amine selected may be heated in an esterification apparatus employing a suitable water entrainer such as toluene and a suitable catalyst for the reaction such as toluene sulfonic acid. The heating may be conducted at approximately 120° C. until substantial amounts of water are formed. This solution now containing alkylamines may then be cooled within the range of 40–50° C. and diketene may be added while the solution is stirred. At the conclusion of the vigorous exothermic reaction the toluene may be evaporated off under vacuum and the product, and acetoacetamide, remains as the residue.

The invention is further described in the following examples:

Example I

Oleyl amine (octadecenylamine) (265 g. or 1.0 mol.) is dissolved in 500 cc. of ethylene dichloride. The solution is stirred and the temperature is maintained at 45–50° C. while 84 g. (1 mol.) of diketene is slowly added. A vigorous exothermic reaction takes place. The ethylene dichloride is evaporated to leave a soft, waxy residue that is N-acetoacetyl oleyl amine, having the structure $CH_3COCH_2CO-NH-C_{18}H_{35}$. The product is soluble in many organic solvents and is compatible with many types of cellulose esters and vinyl resins. It has a soft, waxy texture and is valuable as a textile treating agent. When applied to yarns and fabrics the N-acetoacetyl oleyl amine imparts a soft, smooth hand and also acts as an anti-static agent.

Example II 103 g. of diethylene triamine and 420 g. oleic acid were heated at 120° C. in an esterification apparatus, using toluene as a water entrainer and toluene sulfonic acid as a catalyst. Heating was continued until 28 to 30 cc. of water was eliminated. The product consists primarily of a mixture of amine-amides having the structure $$NH_2-C_2H_4-NH-C_2H_4-NHCOR$$

and $$R-CO-NH-C_2H_4-NH-C_2H_4-NH-COR$$

R is derived from oleic acid. The toluene solution of the amino-amides is cooled to 40–50° C. and stirred while 126 g. (1.5 mols.) of diketene is added. The toluene is then evaporated under vacuum to leave a viscous oil. The product consists essentially of the compounds:

$$CH_3COCH_2CO-NH-C_2H_4-\underset{\underset{COCH_2COCH_3}{|}}{N}-C_2H_4-NHCOC_{17}H_{33}$$

and $$C_{17}H_{33}CO-NH-C_2H_4-\underset{\underset{COCH_2COCH_3}{|}}{N}-C_2H_4-NHCOC_{17}H_{33}$$

These products are individually soluble in mineral oil and may be added to lubricating oils and greases to increase the film strength and improve adhesion to metals.

The mixture of acetoacetamides is especially valuable as a conditioning agent for textile yarns and fabrics. When applied to cellulose ester filaments in spinning or twisting it imparts a soft, smooth hand and greatly reduces the tendency toward static electrification.

Example III

Stearic acid and ethylenediamine are condensed by known methods to give the half-amide having the structure $$C_{17}H_{35}CO-NH-C_2H_4-NH_2$$

One mol of the half-amide is dissolved in dioxane and stirred at 50–60° C. while one mol of diketene is slowly added. The dioxane is evaporated in vacuum to leave a hard wax, melting at about 80—90° C. and having the structure $$C_{17}H_{35}-CONH-C_2H_4-NH-COCH_2COCH_3$$

The product is compatible with cellulose inorganic and organic acid esters and ethers particularly with those mentioned hereinafter and may be employed as a plasticizer for them.

The acetoacetic amide compounds of the invention are valuable plasticizers for cellulose inorganic and organic ester base plastics as represented by cellulose nitrate, and cellulose acetate, cellulose acetate propionate, cellulose acetate butyrate, cellulose propionate, and cellulose propionate butyrate in which various percentages of ester groups are present. The compounds are also advantageously employed as plasticizers for cellulose ethers as represented by ethyl cellulose and benzyl cellulose, and for many types of vinyl resins including polyvinyl acetate, polyvinyl acetate-chloride etc.

The acetoacetic amide compounds containing the higher fatty acids the alkyl radicals of which have carbon atoms from $C_{12}$ to $C_{20}$ and particularly stearic and oleic radicals are useful as textile finishing agents. These compounds impart a soft, smooth hand to yarns and fabrics and reduce the tendency toward static electrification.

The acetoacetic amides of the invention may be added to lubricating oils and greases to improve film strength and adhesion to metals or may be employed as emulsifiers, detergents and surface active agents.

I claim:

1. The process of producing acetoacetyl amides which comprises condensing diketene with a compound selected from the group consisting of those compounds which are represented by the following general formulas:

$$H_2N-C_2H_4-NH-COR_1$$

and $$H_2N-C_2H_4-NH-C_2H_4-NHCOR_1$$

and $$R_1CONH-C_2H_4-NH-C_2H_4-NHCOR_1$$

wherein $R_1$ represents an alkyl radical containing from 8 to 24 carbon atoms.

2. The process of producing acetoacetyl amides which comprises condensing diketene with a compound selected from the group consisting of those compounds which are represented by the following general formulas:

$$H_2N-C_2H_4-NH-COR_1$$

and $$H_2N-C_2H_4-NH-C_2H_4-NHCOR_1$$

and $$R_1CONH-C_2H_4-NH-C_2H_4-NHCOR_1$$

wherein $R_1$ represents an alkyl radical containing from 8 to 24 carbon atoms while maintaining the reaction mixture at a temperature of from 40 to 60° C.

3. The process of producing an acetoacetyl amide having the structure:

$$CH_3COCH_2CO-NH-C_2H_4-\underset{\underset{COCH_2COCH_3}{|}}{N}-C_2H_4-NH-COC_{17}H_{33}$$

which comprises reacting diketene with a compound having the structure:

$$H_2N-C_2H_4-NH-C_2H_4-NHCOC_{18}H_{35}$$

4. The process of producing an acetoacetyl amide having the structure:

$$C_{17}H_{35}CO-NH-C_2H_4-N-C_2H_4-NHCOC_{17}H_{35}$$
$$|$$
$$COCH_2COCH_3$$

which comprises reacting diketene with a compound having the structure:

$$C_{17}H_{35}CO-NH-C_2H_4-NH-C_2H_4-NH-COC_{17}H_{35}$$

5. The process of producing an acetoacetyl amide having the structure:

$$C_{17}H_{35}-CONH-C_2H_4-NH-COCH_2COCH_3$$

which comprises reacting diketene with a compound having the structure:

$$C_{17}H_{35}CONHC_2H_4-NH_2$$

6. The acetoacetyl amides which are represented by the following general formulas:

$$CH_3COCH_2CONH-C_2H_4-NH-COR_1$$

and $$CH_3COCH_2CONH-C_2H_4-NH-C_2H_4-NHCOR_1$$

and $$R_1CONH-C_2H_4-N-C_2H_4-NHCOR_1$$
$$|$$
$$COCH_2COCH_3$$

wherein $R_1$ represents an alkyl radical containing from 8 to 24 carbon atoms.

7. A chemical compound comprising an acetoacetyl amide having the structure:

$$CH_3COCH_2CO-NH-C_2H_4-N-C_2H_4-NH-COC_{17}H_{35}$$
$$|$$
$$COCH_2COCH_3$$

JOHN R. CALDWELL.

REFERENCES CITED

The following references are of record in the file of this patent:

UNITED STATES PATENTS

| Number | Name | Date |
|---|---|---|
| 2,101,532 | Conquest | Dec. 7, 1937 |
| 2,126,560 | Kyrides | Aug. 9, 1938 |
| 2,152,132 | Boese | Mar. 28, 1939 |
| 2,268,395 | Henke | Dec. 30, 1941 |
| 2,306,765 | Stiller | Dec. 29, 1943 |
| 2,345,632 | Robinson et al. | Apr. 4, 1944 |

OTHER REFERENCES

Boese: Industrial and Eng. Chemistry (Jan. 1940), vol. 32, pages 16–22